E. G. ACHESON.
FILTER.
APPLICATION FILED JUNE 5, 1916.
1,193,335.
Patented Aug. 1, 1916.
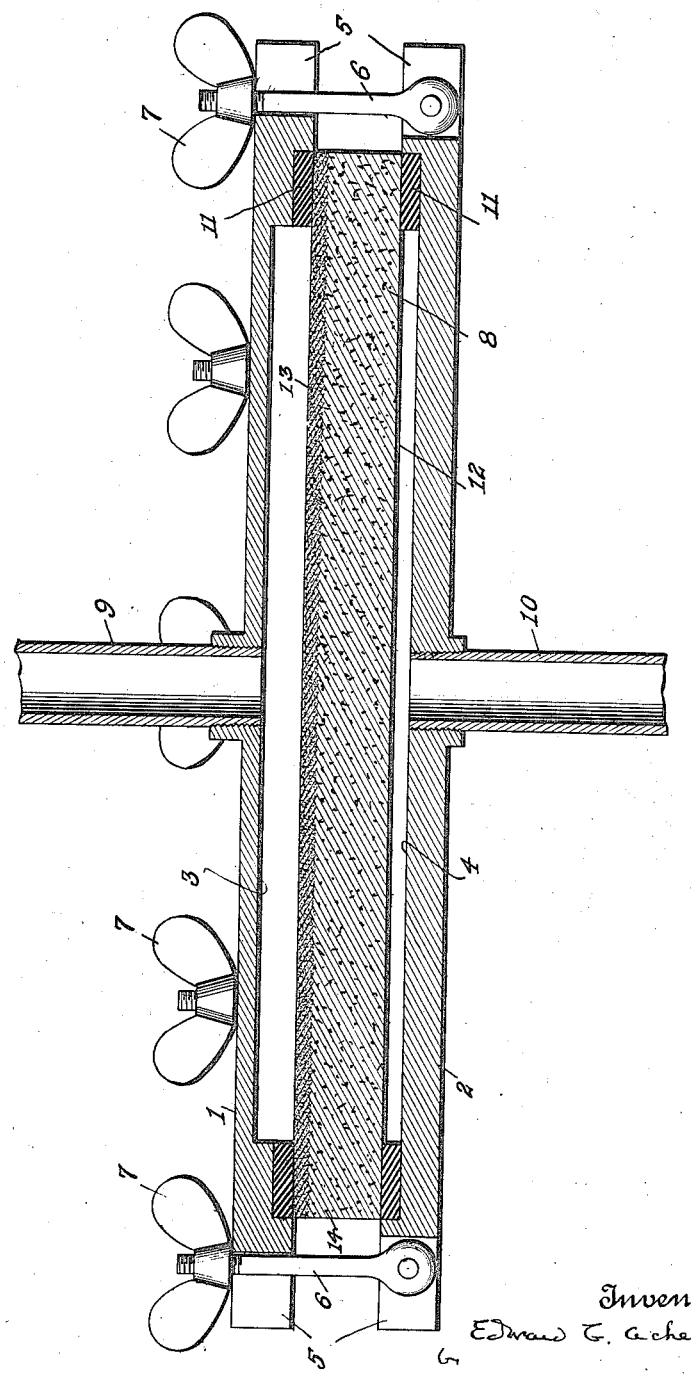

UNITED STATES PATENT OFFICE.

EDWARD GOODRICH ACHESON, OF NEW YORK, N. Y., ASSIGNOR TO ACHESON CORPORATION, OF NEW YORK, N. Y., A CORPORATION OF DELAWARE.

FILTER.

1,193,335.  Specification of Letters Patent.  Patented Aug. 1, 1916.

Application filed June 5, 1916. Serial No. 101,811.

*To all whom it may concern:*

Be it known that I, EDWARD G. ACHESON, a citizen of the United States, residing at New York, in the county of New York and State of New York, have invented certain new and useful Improvements in Filters, of which the following is a specification.

This invention is a filter intended particularly for freeing water from bacteria and from all suspended materials, but capable also of many other applications.

The object of the invention is to provide, in a simple and inexpensive construction, a filter which is effective to remove from water or other liquids the most minute suspended bodies, including bacteria, while permitting at the same time a reasonably free percolation of liquid. This result I achieve by a special application of the properties of so-called "deflocculated bodies."

In my copending application Serial No. 81,984, filed March 3, 1916, I have described and broadly claimed a filtering medium, the constituent particles of which have been subjected to a process of deflocculation followed by baking.

According to the present invention a filtering septum or layer, some of the particles of which have preliminarily been subjected to a process of deflocculation, is supported upon or in the surface of a structurally strong and relatively highly permeable filtering plate.

A preferred embodiment of the invention is illustrated in the accompanying drawing, wherein the figure is a central sectional view.

In said figure, 1 and 2 represent upper and lower plates which may be of cast iron, or of any metal, alloy or substance which is mechanically strong and not liable to corrosion. In the particular form illustrated these plates are recessed on their opposing (inner) faces as indicated at 3, 4, and are provided with peripheral slots 5, in which are pivoted bolts 6 having wing-nuts 7; or any equivalent devices may be provided for clamping firmly between the plates and in spaced relation thereto the composite filtering structure indicated by the numeral 8.

9 and 10 represent respectively the inlet and outlet conduits for water or other liquid.

11, 11 are annular gaskets which may be of rubber, serving to cushion the filter and to make a tight joint therewith.

The filter 8 is composite, consisting essentially of two more or less distinct, although inseparable, portions, to wit, a mechanically strong, rigid and relatively permeable support or body portion 12; and a surface portion 13 which constitutes the filter proper.

The body 12 may be formed for example of clean white sand, bonded by firing with a relatively small proportion of any suitable silicate, as for example a mixture of feldspar and kaolin, thereby forming a highly pervious plate through which the liquid may pass freely. Lateral outflow of the liquid may be prevented by dipping the marginal portions 14 of the plate in a melted silicate or in any other suitable way.

The surface of the plate which receives the liquid to be filtered is provided with a relatively thin layer 13 of material such as is described in my copending application Serial No. 81,984, above referred to; that is to say, a material consisting of or containing a substance which has, at one stage of its preparation, been "deflocculated," this term being used to designate the state of extreme subdivision assumed by amorphous bodies, as clay, graphite, etc., when they are kneaded or otherwise appropriately stirred in presence of solutions of certain organic bodies, of which tannin and related compounds, and dextrin or dextrin-like bodies are examples or types. A material of this character may be prepared as follows: Clay is converted into a paste by means of an aqueous solution of any suitable deflocculating agent, that is to say, an agent having an action thereon similar to that of tannin, and is subjected to a more or less prolonged kneading or mixing operation in a mill. For example, I may add to the clay from 5 to 25 per cent. by weight, more or less, of the deflocculating agent, previously dissolved in sufficient water to convert the clay into a moderately stiff paste. I then subject this paste to continuous kneading for a period of several hours. At the conclusion of this treatment, the clay will be found to be partly deflocculated, the measure of deflocculation being the proportion of the clay which has been rendered permanently suspensible in water. In general, the percentage of deflocculation is greater with the larger percentages of deflocculating agent and with longer time of kneading. The kneading may with advantage be continued until the deflocculating agent is completely fixed in the clay, that is to say, until it cannot be extracted therefrom by water. My invention is not however restricted to the use of any particular deflocculating agent, or to any particular manipulation for accomplishing the deflocculation. The clay thus treated may be immediately spread upon or forced or worked into the surface of the previously fired pervious support 12 and thereafter baked or fired at a temperature sufficient to frit, but not to fuse, the constituent particles. The firing is carried out in practice under oxidizing conditions, whereby all organic matter is burned out. Two or more coats of the deflocculated material may be applied, each coat being preferably fired before the application of the next.

Complete deflocculation is not usually necessary, inasmuch as the exceedingly minute (deflocculated) particles, if present in sufficient proportion, will so fill the interstices between the larger particles as to reduce the porosity of the filter to the degree desired. For some purposes, however, complete or substantially complete deflocculation is desirable, and in such cases the deflocculated portions may be isolated in known manner by suspending the clay, after treatment as above, in water, removing the coarser particles by subsidence, and collecting the deflocculated material in the form of a paste upon a suitable filter. This paste may then be molded into shape, dried and fired or baked as above described.

Filtering media prepared by either of the above described methods possess certain remarkable advantages for the purpose stated. Owing to the extreme subdivision of a sufficient portion or of all of the clay particles, the interstices are so minute that the filtering member or septum, even when very thin, is quite impenetrable to bacteria, with the result that infected water is rendered completely sterile by passage therethrough. Moreover, the deflocculation reduces the shrinkage of the clay during baking, and greatly increases the hardness of the baked article, so that the properly prepared filtering surface is quite free from cracks or fissures. Its impenetrability to bacteria is such that there is little or no liability of such organisms finding lodgment in the interior portions, and the hard and smooth surface is very readily and thoroughly cleaned by scrubbing, scalding or other treatment. The resulting article may be sterilized by baking if desired after a period of use.

I claim:—

1. A composite filter comprising a body portion of relatively permeable material, and a superficial portion, constituent particles of which have been subjected to a process of deflocculation followed by baking.

2. A composite filter comprising a body portion of relatively permeable material, and a superficial portion containing clay, constituent particles of which have been subjected to a process of deflocculation followed by baking.

In testimony whereof I affix my signature in presence of two witnesses.

EDWARD GOODRICH ACHESON.

Witnesses:
JOHN H. ACHESON,
ETHEL M. KARSAY.